US010585690B2

(12) United States Patent
Ahmed et al.

(10) Patent No.: US 10,585,690 B2
(45) Date of Patent: Mar. 10, 2020

(54) ONLINE PROMOTE DISK USING MIRROR DRIVER

(71) Applicant: VMware, Inc., Palo Alto, CA (US)

(72) Inventors: Mohammed Junaid Ahmed, Santa Clara, CA (US); Nishant Yadav, Mountain View, CA (US); Jesse Pool, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 168 days.

(21) Appl. No.: 15/282,740

(22) Filed: Sep. 30, 2016

(65) Prior Publication Data
US 2018/0095775 A1 Apr. 5, 2018

(51) Int. Cl.
*G06F 9/455* (2018.01)

(52) U.S. Cl.
CPC ...... *G06F 9/45558* (2013.01); *G06F 9/45533* (2013.01); *G06F 2009/4557* (2013.01); *G06F 2009/45562* (2013.01); *G06F 2009/45575* (2013.01); *G06F 2009/45579* (2013.01)

(58) Field of Classification Search
CPC ............... G06F 3/0617; G06F 9/45558; G06F 17/30575; H04L 41/0843
See application file for complete search history.

(56) References Cited

U.S. PATENT DOCUMENTS

| | | | | |
|---|---|---|---|---|
| 7,941,510 B1* | 5/2011 | Tormasov | ........... | G06F 11/3006 709/220 |
| 8,201,161 B2* | 6/2012 | Challener | ........... | G06F 9/45537 717/168 |
| 8,453,145 B1* | 5/2013 | Naik | ................... | G06F 9/45558 718/1 |
| 9,292,327 B1* | 3/2016 | von Thenen | ........ | G06F 11/1451 |
| 9,659,074 B1* | 5/2017 | Natanzon | .......... | G06F 17/30575 |
| 9,720,619 B1* | 8/2017 | Shah | .................... | G06F 12/0253 |
| 2009/0037680 A1* | 2/2009 | Colbert | ................. | G06F 3/0617 711/162 |
| 2010/0083276 A1* | 4/2010 | Green | ................. | G06F 9/45558 719/313 |
| 2011/0022694 A1* | 1/2011 | Dalal | .................. | H04L 41/0843 709/222 |

(Continued)

OTHER PUBLICATIONS

VMware, Inc., "Linked Virtual Machines," vSphere Web Services SDK 4.0, Technical Notes, 2009, 5 pgs.

*Primary Examiner* — Lewis A Bullock, Jr.
*Assistant Examiner* — Gilles R Kepnang
(74) *Attorney, Agent, or Firm* — Patterson+Sheridan, LLP (57) ABSTRACT

One or more embodiments provide techniques for promoting a linked clone virtual machine to a full clone virtual machine. In one embodiment, a method includes receiving an instruction to promote the linked clone virtual machine to a full clone virtual machine. The method also includes creating a second base disk for the linked clone virtual machine. The method includes installing a mirror driver between the first delta disk and the second base disk. The method includes copying the contents of the first delta disk to the second base disk with the mirror driver. After the contents of the first delta disk have been copied to the second base disk, the method includes removing the mirror driver and operating the linked clone virtual machine as a full clone virtual machine on the second base disk.

17 Claims, 4 Drawing Sheets

(56) References Cited

U.S. PATENT DOCUMENTS

| | | | |
|---|---|---|---|
| 2014/0095823 A1* | 4/2014 | Shaikh | G06F 12/02 711/165 |
| 2015/0058837 A1* | 2/2015 | Govindankutty | G06F 9/45533 718/1 |
| 2015/0169355 A1* | 6/2015 | Huang | G06F 3/0665 718/1 |
| 2015/0178109 A1* | 6/2015 | Li | G06F 9/45558 718/1 |
| 2015/0324260 A1* | 11/2015 | Mutalik | G06F 9/45558 714/703 |
| 2016/0034294 A1* | 2/2016 | Christenson | G06F 9/45558 718/1 |

\* cited by examiner

ONLINE PROMOTE DISK USING MIRROR DRIVER

BACKGROUND

Linked clone virtual machines (VMs) are two or more virtual machines that share storage. Linked virtual machines support efficient sharing of duplicated data. The shared storage for linked virtual machines is achieved through the use of delta disks. A delta disk is a virtual disk file that resides on top of a base virtual disk backing file. Each time a guest operating system on a virtual machine writes to disk, the data is written to the delta disk associated with that virtual machine. Each time a guest operating system on a virtual machine reads from disk, the virtual machine first targets the disk blocks in the delta disk. If the data is not on the delta disk, the virtual machine looks for the data on the base disk.

Linked clone virtual machines can be created from a snapshotted disk (base disk or delta disk) of a virtual machine. After a linked clone virtual machine is created, the linked clone virtual machine shares the disk chain (base disk and/or delta disk) with one or more other virtual machines, while each virtual machine has its own delta disk.

A linked clone virtual machine can be promoted to a full clone virtual machine by using a virtual machine promotion process. Promoting the linked clone virtual machine can improve the performance of the virtual machine. However, current solutions require the linked clone virtual machine to be powered off while it is promoted to a full clone virtual machine. If a large amount of data needs to be copied, the downtime for the virtual machine can be lengthy.

SUMMARY

One or more embodiments provide techniques for promoting a linked clone virtual machine to a full clone virtual machine. In one embodiment, a method includes receiving an instruction to promote the linked clone virtual machine to a full clone virtual machine, creating a second base disk for the linked clone virtual machine, installing a mirror driver between a first delta disk and the second base disk, and copying the contents of the first delta disk to the second base disk with the mirror driver. After the contents of the first delta disk have been copied to the second base disk, the mirror driver is removed and the linked clone virtual machine is operated as a full clone virtual machine on the second base disk.

Further embodiments include a non-transitory computer-readable storage medium comprising instructions that cause a computer system to carry out the above method, and a system including a processor and a memory with a program executable in the processor to perform operations for carrying out the above method.

DETAILED DESCRIPTION

Embodiments herein provide techniques for promoting a linked clone virtual machine to a full clone virtual machine while the virtual machine remains online (i.e., the virtual machine remains operational). After promotion, the full clone virtual machine has its own base disk. Promotion of the linked clone virtual machine is achieved with the use of a mirror driver. The mirror driver copies the source disk to the destination disk and also, for new input outputs (I/Os) to the source disk, sends a copy of such I/Os to the destination disk. Using the mirror driver for promotion ensures no downtime of the virtual machine during copying.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
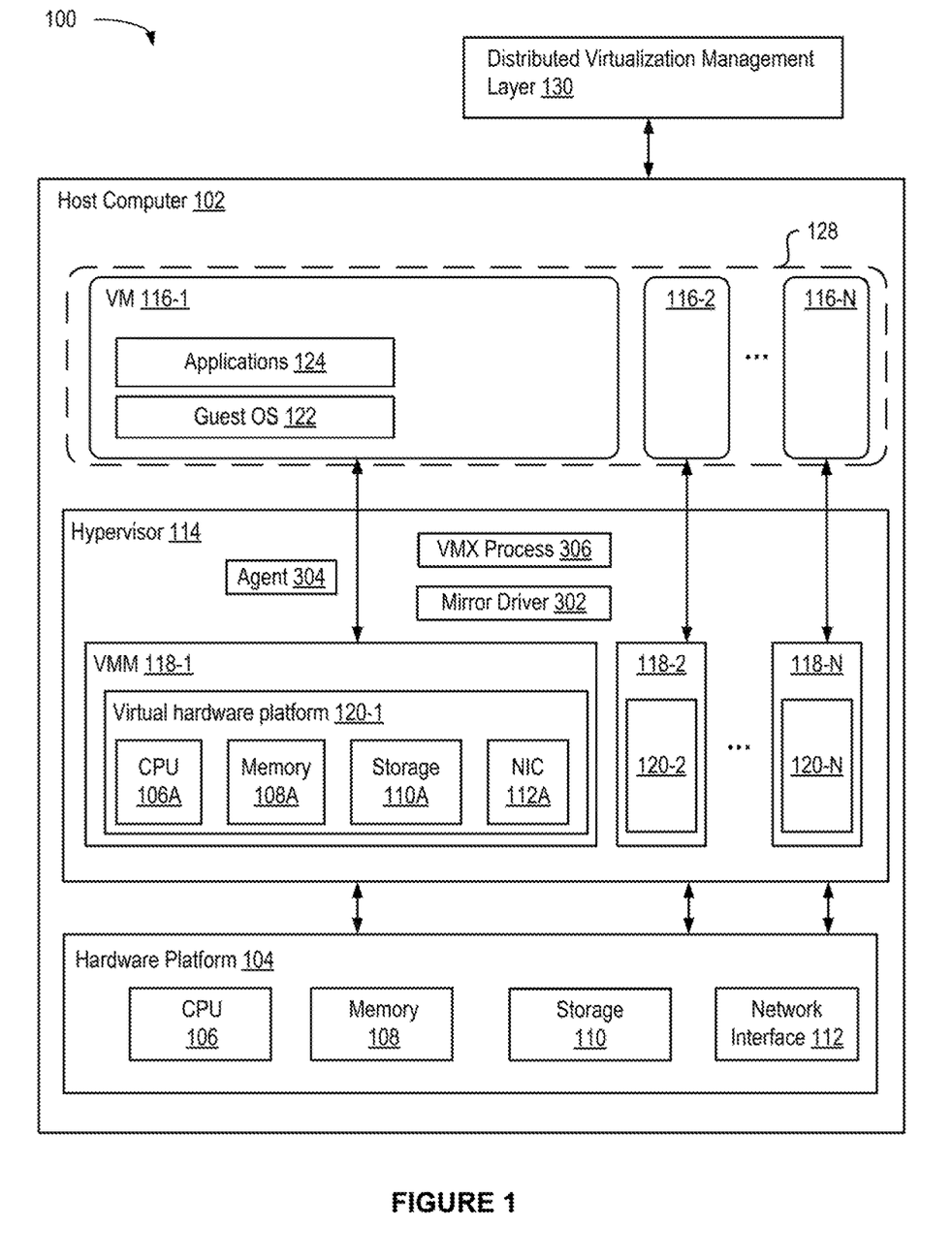
FIG. 1 illustrates a computing system for promoting a linked clone virtual machine according to an embodiment.

FIG. 1 is a block diagram that illustrates a computing system 100 with which one or more embodiments of the present disclosure may be utilized. As illustrated, computing system 100 includes at least one host computer 102. Although a single host is depicted in FIG. 1, it is recognized that computing system 100 may include a plurality of host computers 102, which can be arranged in an interconnected server system such as a data center.

Host 102 is configured to provide a virtualization layer that abstracts computing resources of a hardware platform 104 into multiple resource consumers, such as virtual machines (VMs) 116 (or more generally referred to as "virtual computing instances") that run concurrently on the same host 102. Hardware platform 104 of host 102 includes CPU 106, memory 108, storage 110, networking interface 112, and other conventional components of a computing device. VMs 116 run on top of a software interface layer, referred to herein as a hypervisor 114, that enables sharing of the hardware resources of host 102 by the virtual machines. One example of hypervisor 114 that may be used in an embodiment described herein is a VMware ESXi™ hypervisor provided as part of the VMware vSphere® solution made commercially available from VMware, Inc of Palo Alto, Calif. Hypervisor 114 provides a device driver layer configured to map physical resource of hardware platforms 104 to "virtual" resources of each VM 116 such that each VM 116-1 to 116-N has its own corresponding virtual hardware platform (e.g., a corresponding one of virtual hardware platforms 120-1 to 120-N). Each such virtual hardware platform 120 provides emulated hardware (e.g., memory 108A, processor 106A, storage 110A, network interface 112A, etc.) that may, for example, function as an equivalent, conventional hardware architecture for its corresponding VM 116. Virtual hardware platforms 120-1 to 120-N may be considered part of virtual machine monitors (VMMs) 118-1 to 118-N which implement virtual system support to coordinate operations between hypervisor 114 and corresponding VMs 116-1 to 116-N in the pool of VMs 128. Virtual storage 110A is commonly known as a virtual disk and hypervisor 114 provisions the virtual disk as one or more files in a file system managed by hypervisor 114. In the embodiments illustrated herein, VMs 116 are linked clone virtual machines and the virtual disk of a VM includes a base virtual disk file and one or more delta disk files associated with the VM.

Hypervisor 114 may run on top of a host operating system of host 102 or directly on hardware components of host 102. Each VM 116 includes a guest operating system 122 (e.g., Microsoft Windows®, Linux™) and one or more guest applications and processes running on top of guest operating system 122. Hypervisor 114 further comprises mirror driver 302, which is described in further detail below. The mirror driver 302 is a filter placed on the I/O stack. Agent 304 is also illustrated in hypervisor 114. Agent 304 coordinates operations that support the methods described herein. Hypervisor 114 further comprises a virtual machine executable (VMX) process 306 for implementing certain aspects of a promote disk operation according to embodiments described herein. VMX process 306 may be called by distributed virtualization management layer 130.

Computing system 100 includes distributed virtualization management layer 130 that communicates with the one or more hosts 102. Distributed virtualization management layer 130 is configured to carry out administrative tasks for the computing system 100, including managing hosts 102, managing VMs running within each host 102, provisioning VMs, migrating VMs from one host to another host, and load balancing between hosts 102. In one embodiment, distributed virtualization management layer 130 is a computer program that resides and executes in a central server, which may reside in computing system 100, or alternatively, running as a VM in one of hosts 102. One example of a distributed virtualization management layer 130 is the ESX-Cloud product made available from VMware, Inc. A distributed virtualization management layer 130 may comprise a distributed architecture made up of a plurality of nodes. Nodes can comprise microservices, VMs, or containers, or other resource consumers running on hosts in some embodiments.

Figure 2:
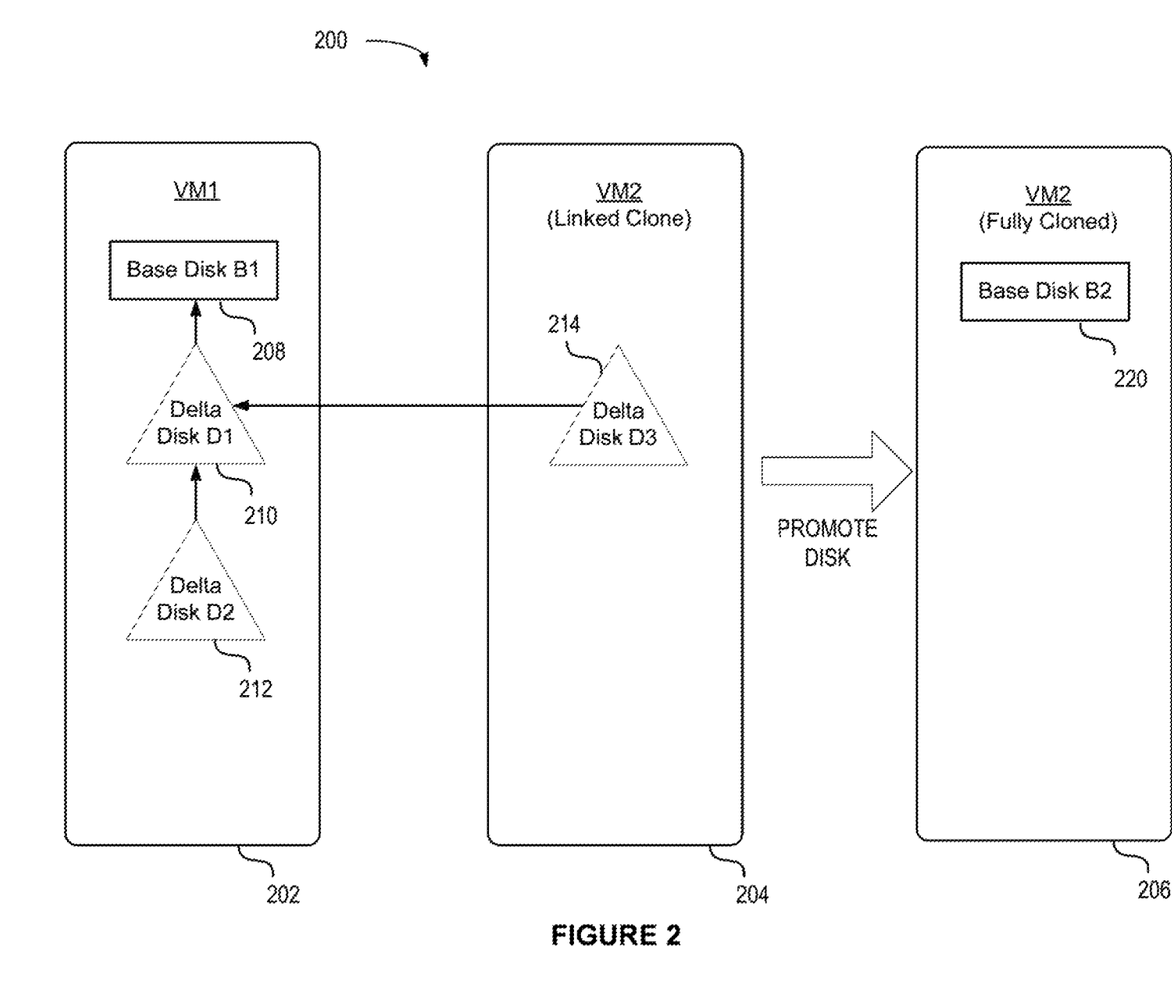
FIG. 2 illustrates a system for promotion of a linked clone virtual machine according to an embodiment.

FIG. 2 illustrates a system 200 comprising a linked clone VM 204 and a promotion of the linked clone VM 204 to VM 206. A first virtual machine VM1 202 is illustrated. VM1 202 is associated with base disk B1 208. Delta disks D1 210 and D2 212 are associated with VM1 202. When the guest operating system on VM1 202 writes to disk, the data is written to the appropriate delta disk. When the guest operating system reads from disk, VM1 202 first looks for the disk block in the delta disks. If the data is not on the delta disks, VM1 202 looks for the data on the base disk B1 208.

VM2 204 is a linked clone of VM1 202. VM2 shares base disk B1 208 with VM1 202. VM2 also has an associated delta disk (delta disk D3 214,). When the guest operating system on VM2 204 writes to disk, data is written to the delta disk D3. When the guest operating system on VM2 204 reads from disk, VM2 204 first targets the delta disk D3. If the data is not on the delta disk, VM2 204 looks for the data on the delta disk D1 210 and base disk B1 208. VM2 204 is therefore a linked clone of VM1 202 because VM2 204 shares the base disk B1 208 with VM1.

To improve performance of VM2 204, VM2 204 may be promoted to a full clone VM using a promote disk operation. Promotion to a full clone VM provides VM2 204 with its own base disk. VM2 204 then operates independently of VM1 202. VM2 206 illustrates VM2 after promotion to a full clone VM. VM2 206 has its own base disk B2 220. VM2 206 is therefore no longer linked to VM1 202 via the shared base disk B1 208. Embodiments described herein support promotion of VMs with native disks as well as non-native disks. That is, the disk format may be either native to the virtual environment or it may be a non-native disk.

Figure 3:
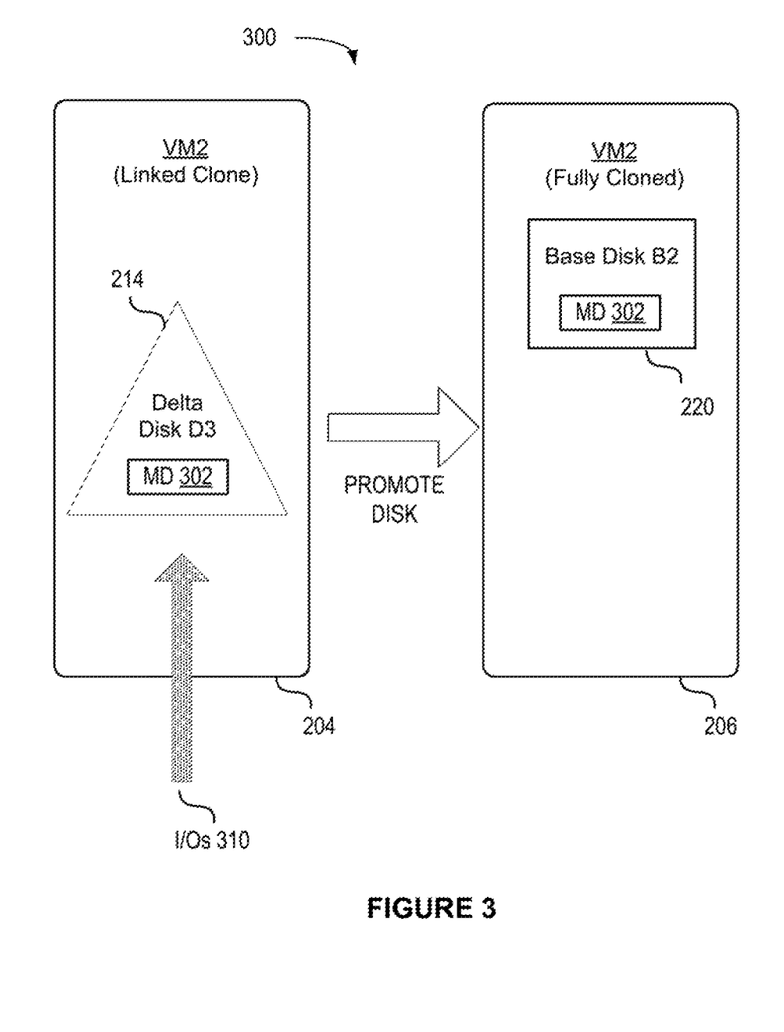
FIG. 3 illustrates a system for online promote disk operations according to an embodiment.

One method for promoting a linked clone VM to a full clone VM is to use a mirror driver. FIG. 3 illustrates a system 300 that includes a mirror driver (MD) 302 for online promote disk operations. Mirror driver 302 is installed on delta disk D3 214 and base disk B2 220. With mirror driver 302, VM2 204 can be promoted from a linked clone to a full clone (VM2 206) without powering off VM2 204. Therefore, the downtime associated with the VM for the promote disk operation is eliminated.

When a promote disk call (or instruction) is received to promote VM2 204, a new base disk (e.g., Base Disk B2 220) is created in the VM directory for VM2 204. Then the mirror driver 302 (also known as a mirror node) is installed. The mirror driver 302 is a type of filter placed on the I/O stack. To install the mirror driver 302, VM2 204 is stunned. A stun operation pauses the execution of the VM at an instruction boundary and allows in-flight I/Os to complete. While the VM is stunned, subsequent I/Os are quiesced (i.e., the I/Os are temporarily paused). Stunning a VM allows a number of different operations to be performed, such as creating or consolidating snapshots. In this embodiment, stunning allows the mirror driver 302 to be installed. Another stun operation is performed to remove mirror driver 302 when the promote disk operation is complete.

After installation of the mirror driver 302, mirror driver 302 receives I/Os 310 and synchronizes the I/Os 310 to both the VM2 linked clone 204 and the VM2 full clone 206. In addition, mirror driver 302 copies the contents of the disk associated with VM2 204 to the new base disk B2 220. The contents of delta disk D3 214 associated with VM2 204 are also copied. During the copying process, VM2 204 continues to operate normally. Thus, VM1 202 and VM2 204 do not experience downtime during copying.

After copying is complete, the mirror driver 302 can be removed by stunning the VM. When mirror driver 302 is removed, the full clone VM2 206 operates independently from VM1 202.

Figure 4:
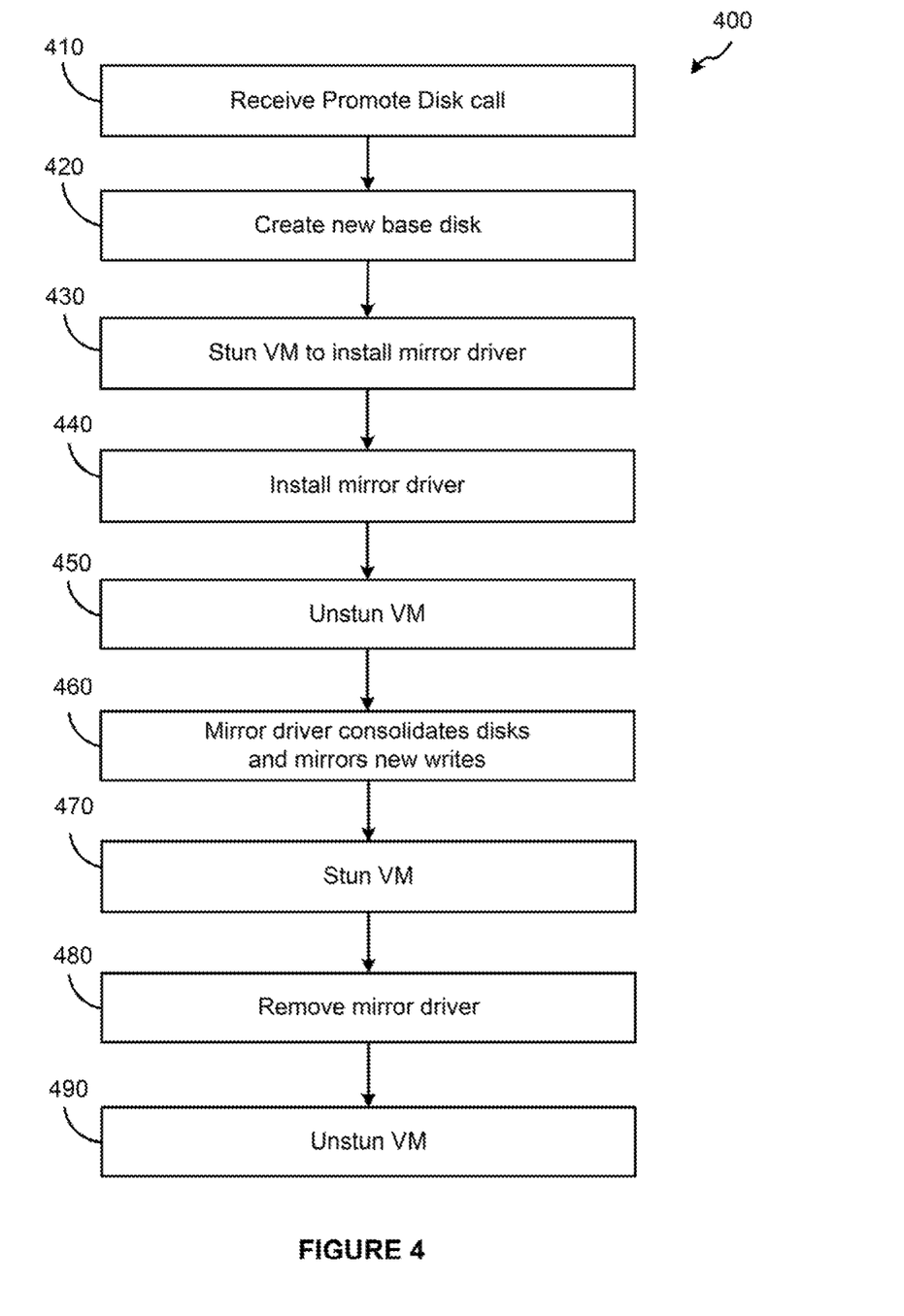
FIG. 4 is a flowchart illustrating a method for converting a linked clone VM to a full clone VM in accordance with an embodiment.

FIG. 4 is a flow diagram illustrating a method 400 for converting a linked clone VM to a full clone VM in accordance with one embodiment of the invention. Although the method steps are described in conjunction with FIGS. 1-3, persons skilled in the art will understand that any system configured to perform the method steps, in any feasible order, falls within the scope of the present invention. In various embodiments, the hardware and/or software elements described in FIGS. 1-3 can be configured to perform the method steps of FIG. 4.

The method 400 begins at step 410 where a Promote Disk request is received. The Promote Disk request is a request to convert a linked clone VM to a full clone VM. In one scenario, distributed virtualization management layer 130 instantiates the Promote Disk process. VMX process 306 is called to perform the Promote Disk. Promotion of a linked clone VM to a full clone VM improves the performance of the VM.

Method 400 proceeds to step 420 where the VMX Process 306 creates the new base disk for the full clone VM. After the base disk is created, the method proceeds to step 430 where VMX process 306 stuns the linked clone VM to install the mirror driver 302. At step 440, agent 304 in hypervisor 114 installs the mirror driver 302. Once the mirror driver 302 is installed, the VM can be unstunned at step 450 by VMX process 306 and operation of the linked clone VM can continue with the mirror driver 302 in the I/O path.

At step 460, the mirror driver 302 consolidates disks and mirrors new I/Os. That is, the mirror driver 302 copies the source disk to the destination disk. The linked clone VM runs normally during the copying process. The mirror driver 302 also forwards any new I/Os to both the source disk and the destination disk.

Once the source disk has been copied, the mirror driver 302 can be removed. The linked clone VM is stunned again by VMX process 306 at step 470 to remove the mirror driver 302. At step 480, agent 304 removes the mirror driver 302 from the I/O stack. Finally, at step 490, the VM is unstunned by VMX process 306. The VM can then begin normal operation as a full clone VM independent of any other VM.

One advantage of the above described embodiments is that a linked clone virtual machine is promoted to a full clone virtual machine while the virtual machine remains online. In addition, the mirror driver ensures that no I/Os are lost during the promotion process.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. These embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for promoting an online linked clone virtual machine to a full clone virtual machine, wherein the linked clone virtual machine is associated with a first delta disk and shares a first base disk with a first virtual machine, comprising:
receiving an instruction to promote the linked clone virtual machine to the full clone virtual machine; creating a second base disk for the linked clone virtual machine;
in response to receiving the instruction and creating the second base disk, installing a mirror driver between the first delta disk and the second base disk;
copying contents of the first base disk and the first delta disk to the second base disk with the mirror driver;
during copying of the contents of the first delta disk to the second base disk, for new input/outputs (I/Os) to the first delta disk, forwarding the new I/Os to both the first delta disk and the second base disk using the mirror driver; and
after the contents of the first base disk and first delta disk have been copied to the second base disk, removing the mirror driver and promoting the linked clone virtual machine to the full clone virtual machine operating on the second base disk, independently from the first virtual machine.

2. The method of claim 1, further comprising: before installing the mirror driver, stunning the linked clone virtual machine.

3. The method of claim 2, further comprising:
quiescing input/outputs (I/Os) to the linked clone virtual machine while the linked clone virtual machine is stunned.

4. The method of claim 3, further comprising:
before removing the mirror driver, stunning the linked clone virtual machine.

5. The method of claim 1, wherein the linked clone virtual machine remains online during promotion to a full clone virtual machine.

6. The method of claim 1, wherein the first base disk is a native disk to a virtual environment.

7. A non-transitory computer-readable storage medium containing a program which, when executed by one or more processors, performs operations for promoting a linked clone virtual machine that is associated with a first delta disk and shares a first base disk with a first virtual machine to a full clone virtual machine, the operations comprising:
receiving an instruction to promote the linked clone virtual machine to a full clone virtual machine; creating a second base disk for the linked clone virtual machine;
in response to receiving the instruction and creating the second base disk, installing a mirror driver between the first delta disk and the second base disk;
copying contents of the first base disk and the first delta disk to the second base disk with the mirror driver;
during copying of the contents of the first delta disk to the second base disk, for new input/outputs (I/Os) to the first delta disk, forwarding the new I/Os to both the first delta disk and the second base disk with the mirror driver; and
after the contents of the first base disk and first delta disk have been copied to the second base disk, removing the mirror driver and promoting the linked clone virtual machine to the full clone virtual machine operating on the second base disk, independently from the first virtual machine.

8. The non-transitory computer-readable storage medium of claim 7, wherein the operations further comprise:
before installing the mirror driver, stunning the linked clone virtual machine.

9. The non-transitory computer-readable storage medium of claim 8, wherein the operations further comprise:
quiescing input/outputs (I/Os) to the linked clone virtual machine while the linked clone virtual machine is stunned.

10. The non-transitory computer-readable storage medium of claim 9, wherein the operations further comprise:
before removing the mirror driver, stunning the linked clone virtual machine.

11. The non-transitory computer-readable storage medium of claim 7, wherein the linked clone virtual machine remains online during promotion to a full clone virtual machine.

12. The non-transitory computer-readable storage medium of claim 7, wherein the mirror driver comprises a filter in an I/O stack.

13. A system, comprising:
a processor; and
a memory, wherein the memory includes a program executable in the processor to perform operations for promoting a linked clone virtual machine that is associated with a first delta disk and shares a first base disk with a first virtual machine to a full clone virtual machine, the operations comprising:
receiving an instruction to promote the linked clone virtual machine to the full clone virtual machine;
creating a second base disk for the linked clone virtual machine; in response to receiving the instruction and creating the second base disk, installing a mirror driver between the first delta disk and the second base disk;
copying contents of the first base disk and first delta disk to the second base disk with the mirror driver;
during copying of the contents of the first delta disk to the second base disk, for new input/outputs (I/Os) to the first delta disk, forwarding the new I/Os to both the first delta disk and the second base disk with the mirror driver; and
after the contents of the first base disk and first delta disk have been copied to the second base disk, removing the mirror driver and promoting the linked clone virtual machine to the full clone virtual machine operating on the second base disk, independently from the first virtual machine.

14. The system of claim 13, wherein the operations further comprise:
before installing the mirror driver, stunning the linked clone virtual machine.

15. The system of claim 14, wherein the operations further comprise:
quiescing input/outputs (I/Os) to the linked clone virtual machine while the linked clone virtual machine is stunned.

16. The system of claim 15, wherein the operations further comprise:

before removing the mirror driver, stunning the linked clone virtual machine.

17. The system of claim 13, wherein the linked clone virtual machine remains online during promotion to a full clone virtual machine.

\* \* \* \* \*